United States Patent [19]
Yokohama et al.

[11] 4,065,174
[45] Dec. 27, 1977

[54] AUTOMOTIVE SEAT CONVERTIBLE TO A BED

[75] Inventors: Masao Yokohama; Shoji Sakai, both of Yokohama, Japan

[73] Assignees: Nissan Motor Co., Ltd.; Ikeda Bussan Company, Limited, both of Yokohama, Japan

[21] Appl. No.: 727,612

[22] Filed: Sept. 28, 1976

[30] Foreign Application Priority Data

Sept. 30, 1975 Japan .................. 50-132903[U]

[51] Int. Cl.² .............................................. A47C 1/02
[52] U.S. Cl. .................................. 297/66; 296/69
[58] Field of Search .............. 296/63, 69; 297/66, 297/64, 63, 65

[56] References Cited

U.S. PATENT DOCUMENTS

| | | | |
|---|---|---|---|
| 1,229,871 | 6/1917 | Boock | 297/66 X |
| 1,393,440 | 10/1921 | Hamilton | 297/66 |
| 1,725,807 | 8/1929 | Leutz | 297/66 |
| 2,576,343 | 11/1951 | Hibbard | 297/66 X |
| 2,796,111 | 6/1957 | Janczyszyn | 297/66 |

*Primary Examiner*—Joseph F. Peters, Jr.
*Assistant Examiner*—R. Schrecengost
*Attorney, Agent, or Firm*—Bacon & Thomas

[57] ABSTRACT

A seat cushion of a rear seat is cut away at its forward part to provide a forwardly and upwardly opening recess. A foldable cushion is usually received within the recess, while it is foldable upwardly and rearwardly to be laid upon the remaining portion of the seat cushion. A backrest of a front seat is tiltable to be substantially planar with the rear seat cushion to be received the recess, forming a sleeper's bed.

7 Claims, 6 Drawing Figures

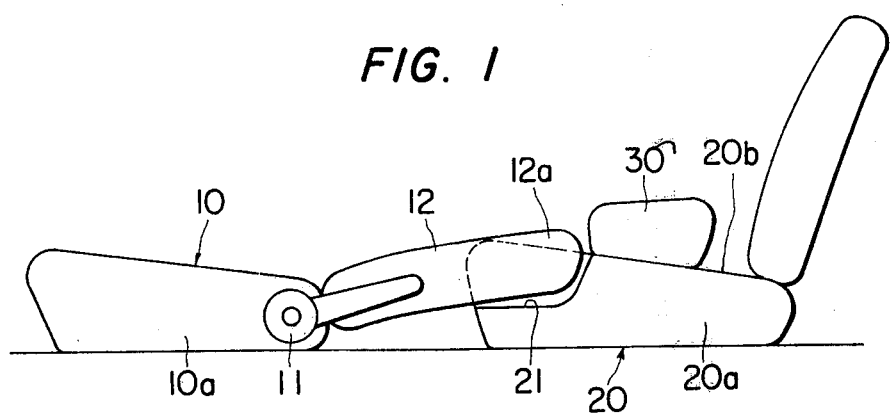
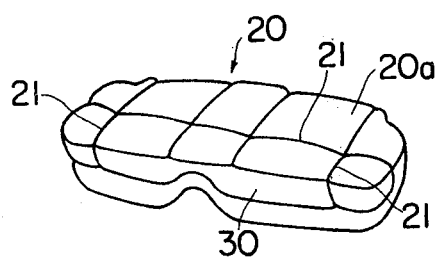
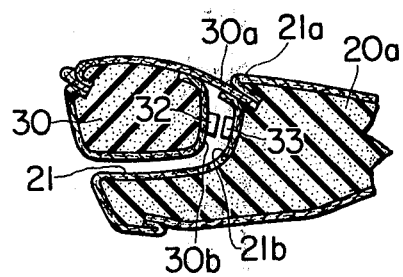
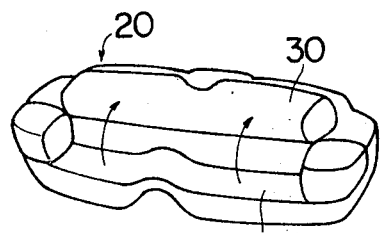
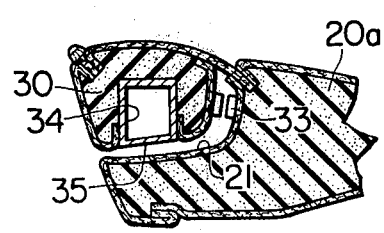
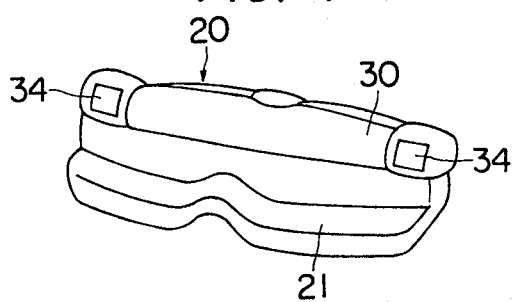

AUTOMOTIVE SEAT CONVERTIBLE TO A BED

This invention relates to a vehicle seat assembly and in particular to seats convertible to beds for an automotive vehicle.

A primary object of this invention is to furnish a vehicle occupant's space with a seat assembly convertible to comfortable sleeper's beds. Another object of this invention is to provide a convertible seat assembly of the aforementioned type which is converted to beds by a simple operation with no additional constituent elements.

According to this invention, the aforementioned objects are achieved in a manner that the seat assembly of the vehicle is as usual comprised of a front seat with a tiltable backrest and a rear seat, the seat cushion of which is at its forward part cut away to provide a forwardly and upwardly opening recess. A foldable cushion is received within the recess ordinarily forming part of the rear seat cushion, while it is foldable upwardly and rearwardly to be laid upon the remaining part of the seat cushion. The backrest of the front seat is then tilted to be substantially planar with the rear seat cushion, whereupon a top of the backrest is fitted in the recess, thus forming a comfortable sleeper's bed with a pillow.

Other objects, features and advantages to be achieved by this invention will be hereinafter described in more detail, reference being made to the accompanying drawing, in which:

FIG. 1 is a schematic elevation of a convertible seat assembly according to a preferred embodiment of this invention;

FIGS. 2 and 3 are perspective views illustrating a rear seat cushion of the embodiment shown in FIG. 1;

FIG. 4 is a perspective view illustrating a design alternative to the embodiment shown in FIGS. 1 to 3;

FIG. 5 is a section taken along line V—V of FIG. 2; and

FIG. 6 is a section similar to FIG. 5 illustrating the arrangement shown in FIG. 4.

As shown in FIG. 1, the convertible seat assembly comprises a front seat 10 and a rear seat 20 with their respective backrests. Although the seats may be of any conventional type, a typical arrangement in a passenger car having a separate type front seat and a bench-type rear seat for two or more occupants is conveniently employable in the embodiment of this invention. The backrest 12 of the front seat 10 is pivotal or tiltable by any conventional hinge mechanism 11 approximately through the angle 90° so that the backrest 12 is substantially planar with a seat cushion 10a of the front seat.

According to this invention, a forward part of an upholstered seat cushion 20a of the rear seat 20 is cut away to form a transverse recess 21 forwardly and upwardly opening, only a profile of which is shown in FIG. 1. Since the distance between the front seat 10 and the rear seat 20 is suitably selected, the top portion 12a of each front seat backrest 12 is received in a corresponding half of the recess 21 of the seat cushion 20a. The seat cushion 10a and the backrest 12 of each front seat 10 and the rear seat cushion 20a are thus approximately planar with one another, thus forming a single sleeper's bed.

To ensure the usual employment of the rear seat 20 as a chair, a foldable cushion 30 shaped to match the recess 21 is fitted within the recess 21 as particularly seen in FIGS. 5 and 6. The cushion 30 is preferably upholstered similarly as the seat cushion 20a to provide a unitary appearance. The cushion 30 and the seat cushion 20a are joined together at their upper peripheral edges 30a and 21a on a plane of the upper surface 20b of the seat cushion 20 so that the foldable cushion 30 is pivotal about the peripheral edges 30a and 31a upwardly and rearwardly until its upper surface rests upon the seat cushion 20a. It would be readily understood that the cushion 30 in its folded position provides a pillow or headrest for the bed formed in the aforementioned manner, while it forms a usual seat cushion by filling the recess 21. Most preferably, separable joining means such as so-called "hook-and-eye" contact adhesive members 32 and 33 are attached, as seen in FIGS. 5 and 6, respectively on the rear end face 30b of the cushion 30 and on the front end face 21b of the seat cushion 20a in contact with each other to immobilize the cushion 30 in the recess 21. This enables a seating stability and comfortability like a unitary seat cushion.

As best seen in FIGS. 2 and 3, the recess 21 may terminate short of the both lateral ends of the seat cushion 20a to receive the foldable cushion 30 of a corresponding transverse width. An unfoldable small portion of the seat cushion 20a therefore remains at each end of the seat cushion 20a.

FIGS. 4 and 6 illustrate an example in which the recess 21 and therefore the cushion 30 extend throughout the transverse width of the seat cushion 20a. A small box 34 is embedded in each end portion of the foldable cushion 30. The box 34 has an opening (no numeral) with a lid 35 which opens to the front when the cushion 30 is in its folded position as in FIG. 4. The boxes thus formed are convenient for storing therein belongings of the seat occupants such as watches and glasses while they are lying on the beds.

What is claimed is:

1. A convertible seat for an automotive vehicle, comprising a front seat with a seat cushion and a tiltable backrest, a rear seat with a seat cushion spaced from the front seat by a predetermined distance, a forward part of the rear seat cushion being cut away to form an upwardly and forwardly opening recess, and a foldable cushion snugly received within the recess of the rear seat cushion and partially connected to the rear seat cushion, the foldable cushion being foldable to be laid upon the rear seat cushion.

2. A convertible seat according to claim 1, in which the backrest is tiltable until its top portion is fitted within said recess.

3. A convertible seat according to claim 1, in which the foldable cushion and the rear seat cushion are joined together at their peripheral edges on a plane of the seat cushion surface.

4. A convertible seat according to claim 1, comprising separable joining means formed respectively on the contact surfaces of the foldable cushion and the rear seat cushion defining the recess.

5. A convertible seat according to claim 1, in which the recess and the foldable cushion terminate short of the both transverse ends of the rear seat cushion and an unfoldable portion of the rear seat cushion remains at each said end.

6. A convertible seat according to claim 1, in which the recess and the foldable cushion extend throughout the transverse width of the rear seat cushion.

7. A convertible seat according to claim 6, comprising a box embedded in each end portion of said foldable cushion, the box having an opening which is forwardly open in a folded position of the foldable cushion.

* * * * *